(12) United States Patent
Lee et al.

(10) Patent No.: US 9,794,892 B2
(45) Date of Patent: Oct. 17, 2017

(54) METHOD AND ELECTRONIC DEVICE FOR PROVIDING WIRELESS COMMUNICATION

(71) Applicant: Samsung Electronics Co., Ltd., Gyeonggi-do (KR)

(72) Inventors: Seokwoo Lee, Gumi-si (KR); Soonsang Park, Daegu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/461,314

(22) Filed: Mar. 16, 2017

(65) Prior Publication Data

US 2017/0273033 A1 Sep. 21, 2017

(30) Foreign Application Priority Data

Mar. 18, 2016 (KR) ........................ 10-2016-0032804

(51) Int. Cl.
*H04B 7/00* (2006.01)
*H04W 52/28* (2009.01)
(Continued)

(52) U.S. Cl.
CPC ......... *H04W 52/283* (2013.01); *H04W 4/023* (2013.01); *H04W 4/025* (2013.01); *H04W 84/12* (2013.01)

(58) Field of Classification Search
CPC ... H04W 52/283; H04W 4/023; H04W 4/025; H04W 84/12
(Continued)

(56) References Cited

U.S. PATENT DOCUMENTS 7,415,242 B1\* 8/2008 Ngan ................. H04B 7/15557
370/274
8,775,106 B2 7/2014 Zenati et al.
(Continued)

FOREIGN PATENT DOCUMENTS

EP 2950596 A1 12/2015
KR 2014-0124305 A 10/2014
KR 2015-0117577 A 10/2015

OTHER PUBLICATIONS

Foreign Communication from Related Counterpart Application; PCT Application No. PCT/KR2017/002856; International Search Report dated Jun. 21, 2017; 3 pages.

*Primary Examiner* — Dominic Rego

(57) ABSTRACT

An electronic device includes a housing; at least one communication circuit positioned inside the housing, wherein the at least one communication circuit is configured to provide a first wireless communication based on a first protocol, and/or a second wireless communication based on a second protocol, a sensor configured to detect a distance between a portion of the electronic device and an external object, a control circuit configured to cause the communication circuit to provide the first wireless communication at a first power level when the distance is within a first range, and at a second power level when the distance is outside the first range, and cause the communication circuit to provide the second wireless communication at a third power level when the distance is within a second range, and at a fourth power level when the distance is outside the second range, wherein the second range is different from the first range.

20 Claims, 11 Drawing Sheets

(51) Int. Cl.
*H04W 4/02* (2009.01)
*H04W 84/12* (2009.01)

(58) Field of Classification Search
USPC .................. 455/522, 68–70, 41.2, 575.1
See application file for complete search history.

(56) References Cited

U.S. PATENT DOCUMENTS

| | | | |
|---|---|---|---|
| 8,792,930 B1* | 7/2014 | Gopalakrishnan | H01Q 1/243 |
| | | | 455/117 |
| 9,219,987 B2* | 12/2015 | Ghosh | H04L 29/08 |
| 9,374,655 B1* | 6/2016 | Lee | H04W 4/023 |
| 9,392,548 B2 | 7/2016 | Lee et al. | |
| 2012/0208478 A1 | 8/2012 | Greenwood et al. | |
| 2013/0064118 A1* | 3/2013 | Robinson | H04W 16/14 |
| | | | 370/252 |
| 2014/0229055 A1* | 8/2014 | Itoi | G07C 5/008 |
| | | | 701/31.5 |
| 2014/0306553 A1 | 10/2014 | Lee | |
| 2014/0341201 A1* | 11/2014 | Ibrahim | H04W 4/001 |
| | | | 370/338 |
| 2015/0099558 A1 | 4/2015 | Zehr et al. | |
| 2015/0199037 A1 | 7/2015 | Reunamaki et al. | |
| 2017/0094601 A1* | 3/2017 | Hardt | H04W 52/0229 |

\* cited by examiner

METHOD AND ELECTRONIC DEVICE FOR PROVIDING WIRELESS COMMUNICATION

CROSS-REFERENCE TO RELATED APPLICATION AND CLAIM OF PRIORITY

The present application is based on and claims priority under 35 U.S.C. §119 to a Korean patent application filed on Mar. 18, 2016 in the Korean Intellectual Property Office and assigned Serial number 10-2016-0032804, the disclosure of which is incorporated by reference herein in its entirety.

TECHNICAL FIELD

The present disclosure relates to a method and electronic device for providing wireless communication.

BACKGROUND

The present disclosure relates to a method and electronic device for providing wireless communication.

Electronic devices may include an antenna for communication. The antenna may operate according to preset radiation power. Further, a performance (e.g., a data transmission and reception speed) of the antenna may be changed according to intensity of preset radiation power.

Radiation power of the antenna may be determined in consideration of a value of a reference Specific Absorption Rate (SAR: an amount of an electromagnetic wave that may be absorbed in a human body) according to a mobile phone radio wave rating system occurring in the antenna. For example, when it is expected that radiation power of the antenna will exceed a reference SAR value, an electronic device lowers radiation power to reduce an amount of an electromagnetic wave that may be absorbed to a user.

Conventionally, when a distance between an external object (e.g., a portion of a human body) and a portion of the electronic device is within a predetermined range, the electronic device reduced radiation power of an antenna. In this case, the electronic device uniformly reduced radiation power regardless of a kind of wireless communication and thus in some wireless communication, even when it is unnecessary to reduce radiation power (e.g., when the user has no influence on an electromagnetic wave), the electronic device is operated with a low radiation power value and thus there is a problem that efficient data transmission and reception may not be performed.

SUMMARY

To address the above-discussed deficiencies, it is a primary object to provide a method and electronic device for providing wireless communication.

In accordance with an aspect of the present disclosure, an electronic device includes: a housing; at least one communication circuit positioned inside the housing, wherein the at least one communication circuit is configured to provide a first wireless communication based on a first protocol, and/or a second wireless communication based on a second protocol; a sensor configured to detect a distance between a portion of the electronic device and an external object; a control circuit positioned inside the housing, and electrically coupled to the at least one communication circuit and the sensor, wherein the control circuit is configured to: cause the communication circuit to provide the first wireless communication at a first power level when the distance is within a first range, and at a second power level when the distance is outside the first range, and cause the communication circuit to provide the second wireless communication at a third power level when the distance is within a second range, and at a fourth power level when the distance is outside the second range, wherein the second range is different from the first range.

In accordance with another aspect of the present disclosure, a method in which an electronic device provides wireless communication includes: detecting a distance between a portion of the electronic device and an external object; providing, if the detected distance is within a first range, a first wireless communication at a first power level and providing, if the detected distance is outside the first range, the first wireless communication at a second power level, when the communication circuit provides the first wireless communication based on a first protocol; and providing, if the detected distance is within a second range, second wireless communication at a third power level and providing, if the detected distance is outside the second range, the first wireless communication at a fourth power level, when the communication circuit provides the second wireless communication based on a second protocol, wherein the second range is different from the first range.

In accordance with another aspect of the present disclosure, a recording medium on which a program that provides a wireless communication is stored, wherein the recording medium stores a program for executing operation of detecting a distance between a portion of the electronic device and an external object; operation of providing, if the detected distance is within a first range, a first wireless communication at a first power level and providing, if the detected distance is outside the first range, the first wireless communication at a second power level, when the communication circuit provides first wireless communication based on a first protocol; and operation of providing, if the detected distance is within a second range, the second wireless communication at a third power level and providing, if the detected distance is outside the second range, the first wireless communication at a fourth power level, when the communication circuit provides second wireless communication based on a second protocol, wherein the second range is different from the first range.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
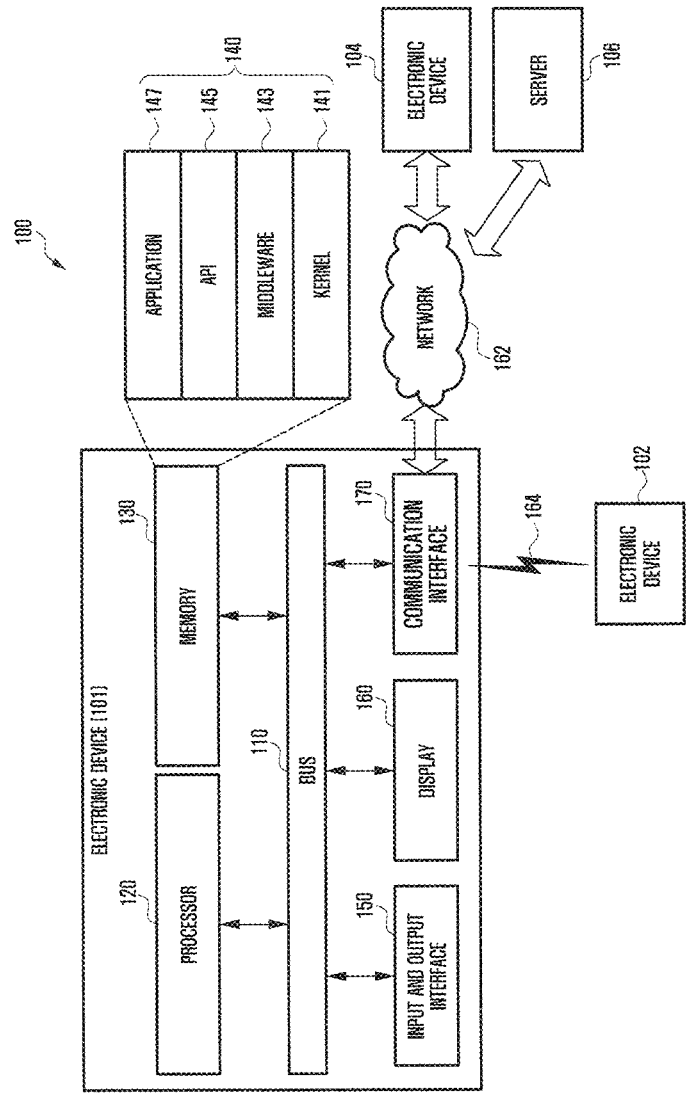
FIG. 1 is a block diagram illustrating a network environment including an electronic device according to various exemplary embodiments.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, exemplary embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the invention and is not intended to limit the invention to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate exemplary embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic accessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure.

FIG. 1 is a block diagram 100 illustrating an electronic apparatus according to an embodiment of the present disclosure.

Referring to FIG. 1, the electronic apparatus 101 can include a bus 110, a processor 120, a memory 130, a user input module 150, a display 160, and a communication interface 170.

The bus 110 can be a circuit for interconnecting elements described above and for allowing a communication, e.g. by transferring a control message, between the elements described above.

The processor 120 can receive commands from the above-mentioned other elements, e.g. the memory 130, the user input module 150, the display 160, and the communication interface 170, through, for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 can include software and/or programs 140, such as a kernel 141, middleware 143, an Application Programming Interface (API) 145, and an application 147. Each of the programming modules described above can be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 100.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 100 to at least one application from among the at least one of the application 147.

The API 145 is an interface through which the application 147 can control a function provided by the kernel 141 and/or the middleware 143, and can include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 100 and another electronic devices 102 and 104 and/or a server 164. The communication interface 170 can support short range communication protocols, e.g. a Wireless Fidelity® (WiFi®) protocol, a BlueTooth® (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 can be a same type and/or different types of electronic apparatus.

Figure 2:
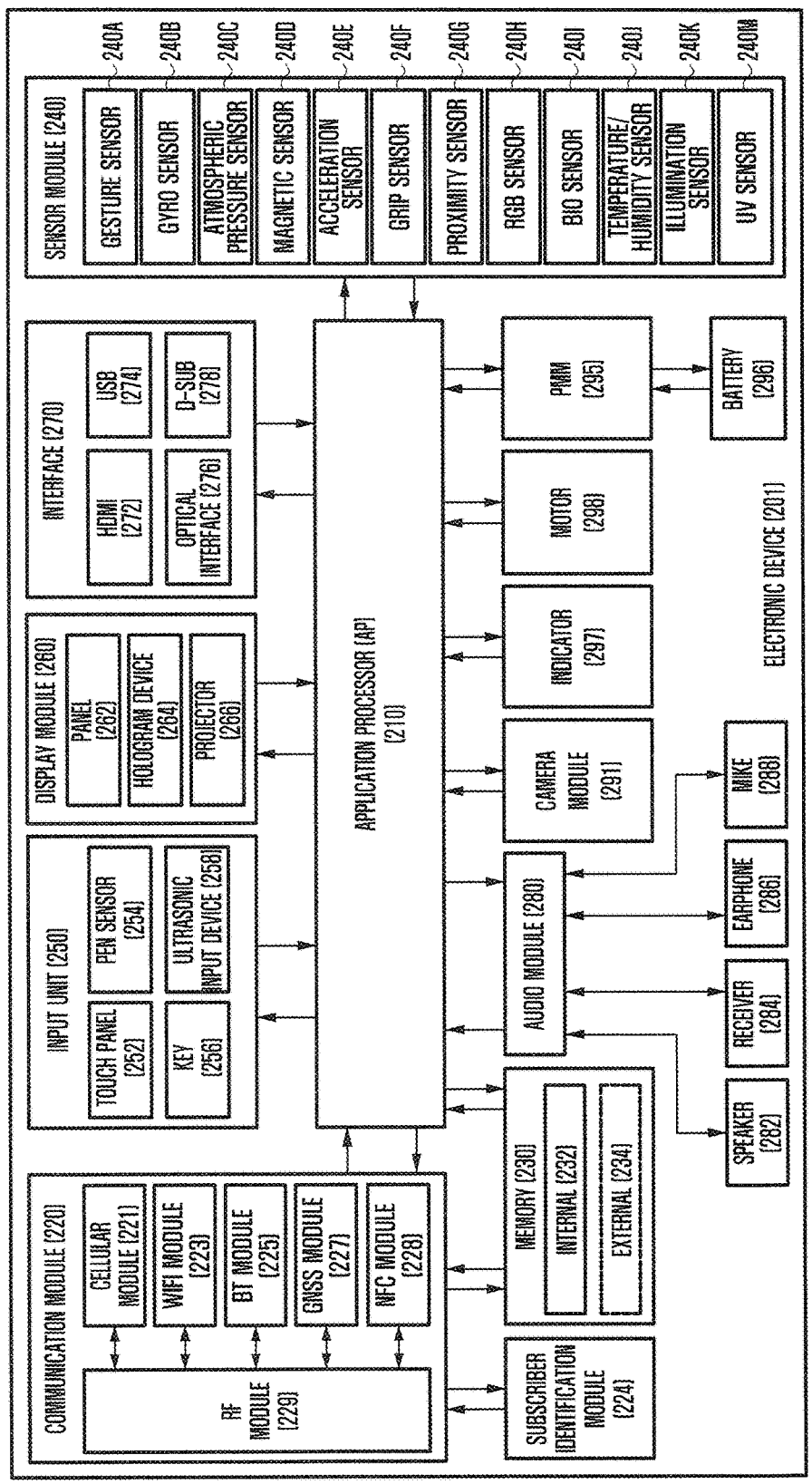
FIGS. 2 and 3 are block diagrams illustrating a configuration of an electronic device according to various exemplary embodiments.

FIG. 2 is a block diagram illustrating an electronic device 201 in accordance with an embodiment of the present disclosure. The electronic device 201 can form, for example, the whole or part of the electronic device 101 shown in FIG. 1. Referring to FIG. 2, the electronic device 201 can include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 can drive an operating system or applications, control a plurality of hardware or software components connected thereto, and also perform processing and operation for various data including multimedia data. The AP 210 can be formed of system-on-chip (SoC), for example. According to an embodiment, the AP 210 can further include a graphic processing unit (GPU) (not shown).

The communication module 220 (e.g., the communication interface 160) can perform a data communication with any other electronic device (e.g., the electronic device 104 or the server 106) connected to the electronic device 200 (e.g., the electronic device 101) through the network. According to an embodiment, the communication module 220 can include therein a cellular module 221, a WiFi® module 223, a BT module 225, a GPS module 227, an NFC module 228, and an RF (Radio Frequency) module 229.

The cellular module 221 can offer a voice call, a video call, a message service, an internet service, or the like through a communication network (e.g., LTE, LTE-A, CDMA, WCDMA, UMTS, WiBro, or GSM, etc.). Additionally, the cellular module 221 can perform identification and authentication of the electronic device in the communication network, using the SIM card 224. According to an embodiment, the cellular module 221 can perform at least part of functions the AP 210 can provide. For example, the cellular module 221 can perform at least part of a multimedia control function.

According to an embodiment, the cellular module 221 can include a communication processor (CP). Additionally, the cellular module 221 can be formed of SoC, for example. Although some elements such as the cellular module 221 (e.g., the CP), the memory 230, or the power management module 295 are shown as separate elements being different from the AP 210 in FIG. 2, the AP 210 can be formed to have at least part (e.g., the cellular module 221) of the above elements in an embodiment.

According to an embodiment, the AP 210 or the cellular module 221 (e.g., the CP) can load commands or data, received from a nonvolatile memory connected thereto or from at least one of the other elements, into a volatile memory to process them. Additionally, the AP 210 or the cellular module 221 can store data, received from or created at one or more of the other elements, in the nonvolatile memory.

Each of the WiFi® module 223, the BT module 225, the GPS module 227 and the NFC module 228 can include a processor for processing data transmitted or received therethrough. Although FIG. 2 shows the cellular module 221, the WiFi® module 223, the BT module 225, the GPS module 227 and the NFC module 228 as different blocks, at least part of them can be contained in a single IC (Integrated Circuit) chip or a single IC package in an embodiment. For example, at least part (e.g., the CP corresponding to the cellular module 221 and a WiFi® processor corresponding to the WiFi® module 223) of respective processors corresponding to the cellular module 221, the WiFi® module 223, the BT module 225, the GPS module 227 and the NFC module 228 can be formed as a single SoC.

The RF module 229 can transmit and receive data, e.g., RF signals or any other electric signals. Although not shown, the RF module 229 can include a transceiver, a PAM (Power Amp Module), a frequency filter, an LNA (Low Noise Amplifier), or the like. Also, the RF module 229 can include any component, e.g., a wire or a conductor, for transmission of electromagnetic waves in a free air space. Although FIG. 2 shows that the cellular module 221, the WiFi® module 223, the BT module 225, the GPS module 227 and the NFC module 228 share the RF module 229, at least one of them can perform transmission and reception of RF signals through a separate RF module in an embodiment.

The SIM card 224 can be a specific card formed of SIM and can be inserted into a slot (not shown) formed at a certain place of the electronic device. The SIM card 224 can contain therein an ICCID (Integrated Circuit Card IDentifier) or an IMSI (International Mobile Subscriber Identity).

The memory 230 (e.g., the memory 130) can include an internal memory 232 and an external memory 234. The internal memory 232 can include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 can have the form of an SSD (Solid State Drive). The external memory 234 can include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 can be functionally connected to the electronic device 200 through various interfaces. According to an embodiment, the electronic device 200 can further include a storage device or medium such as a hard drive.

The sensor module 240 can measure physical quantity or sense an operating status of the electronic device 200, and then convert measured or sensed information into electric signals. The sensor module 240 can include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 can include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 can include a control circuit for controlling one or more sensors equipped therein.

The input unit 250 can include a touch panel 252, a digital pen sensor 254, a key 256, or an ultrasonic input unit 258.

The touch panel 252 can recognize a touch input in a manner of capacitive type, resistive type, infrared type, or ultrasonic type. Also, the touch panel 252 can further include a control circuit. In case of a capacitive type, a physical contact or proximity can be recognized. The touch panel 252 can further include a tactile layer. In this case, the touch panel 252 can offer a tactile feedback to a user.

The digital pen sensor 254 can be formed in the same or similar manner as receiving a touch input or by using a separate recognition sheet. The key 256 can include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 can receive a user input from any external device (e.g., a computer or a server) connected thereto through the communication module 220.

The display 260 (e.g., the display 150) can include a panel 262, a hologram 264, or a projector 266. The panel 262 can be, for example, LCD (Liquid Crystal Display), AM-OLED (Active Matrix Organic Light Emitting Diode), or the like. The panel 262 can have a flexible, transparent or wearable form. The panel 262 can be formed of a single module with the touch panel 252. The hologram 264 can show a stereoscopic image in the air using interference of light. The projector 266 can project an image onto a screen, which can be located at the inside or outside of the electronic device 200. According to an embodiment, the display 260 can further include a control circuit for controlling the panel 262, the hologram 264, and the projector 266.

The interface 270 can include, for example, an HDMI (High-Definition Multimedia Interface) 272, a USB (Universal Serial Bus) 274, an optical interface 276, or a D-sub (D-subminiature) 278. The interface 270 can be contained, for example, in the communication interface 160 shown in FIG. 1. Additionally or alternatively, the interface 270 can include, for example, an MHL (Mobile High-definition Link) interface, an SD (Secure Digital) card/MMC (Multi-Media Card) interface, or an IrDA (Infrared Data Association) interface.

The audio module 280 can perform a conversion between sounds and electric signals. At least part of the audio module 280 can be contained, for example, in the input/output interface 140 shown in FIG. 1. The audio module 280 can process sound information inputted or outputted through a speaker 282, a receiver 284, an earphone 286, or a microphone 288.

The camera module 291 is a device capable of obtaining still images and moving images. According to an embodiment, the camera module 291 can include at least one image sensor (e.g., a front sensor or a rear sensor), a lens (not shown), an ISP (Image Signal Processor, not shown), or a flash (e.g., LED or xenon lamp, not shown).

The power management module 295 can manage electric power of the electronic device 200. Although not shown, the power management module 295 can include, for example, a PMIC (Power Management Integrated Circuit), a charger IC, or a battery or fuel gauge.

The PMIC can be formed, for example, of an IC chip or SoC. Charging can be performed in a wired or wireless manner. The charger IC can charge a battery 296 and prevent overvoltage or overcurrent from a charger. According to an embodiment, the charger IC can have a charger IC used for at least one of wired and wireless charging types. A wireless charging type can include, for example, a magnetic resonance type, a magnetic induction type, or an electromagnetic type. Any additional circuit for a wireless charging can be further used such as a coil loop, a resonance circuit, or a rectifier.

The battery gauge can measure the residual amount of the battery 296 and a voltage, current or temperature in a charging process. The battery 296 can store or create electric power therein and supply electric power to the electronic device 200. The battery 296 can be, for example, a rechargeable battery or a solar battery.

The indicator 297 can show thereon a current status (e.g., a booting status, a message status, or a recharging status) of the electronic device 200 or of its part (e.g., the AP 210). The motor 298 can convert an electric signal into a mechanical vibration. Although not shown, the electronic device 200 can include a specific processor (e.g., GPU) for supporting a mobile TV. This processor can process media data that comply with standards of DMB (Digital Multimedia Broadcasting), DVB (Digital Video Broadcasting), or media flow.

Each of the above-discussed elements of the electronic device disclosed herein can be formed of one or more components, and its name can be varied according to the type of the electronic device. The electronic device disclosed herein can be formed of at least one of the above-discussed elements without some elements or with additional other elements. Some of the elements can be integrated into a single entity that still performs the same functions as those of such elements before integrated.

The term "module" used in this disclosure can refer to a certain unit that includes one of hardware, software and firmware or any combination thereof. The module can be interchangeably used with unit, logic, logical block, component, or circuit, for example. The module can be the minimum unit, or part thereof, which performs one or more particular functions. The module can be formed mechanically or electronically. For example, the module disclosed herein can include at least one of ASIC (Application-Specific Integrated Circuit) chip, FPGAs (Field-Programmable Gate Arrays), and programmable-logic device, which have been known or are to be developed.

Figure 3:
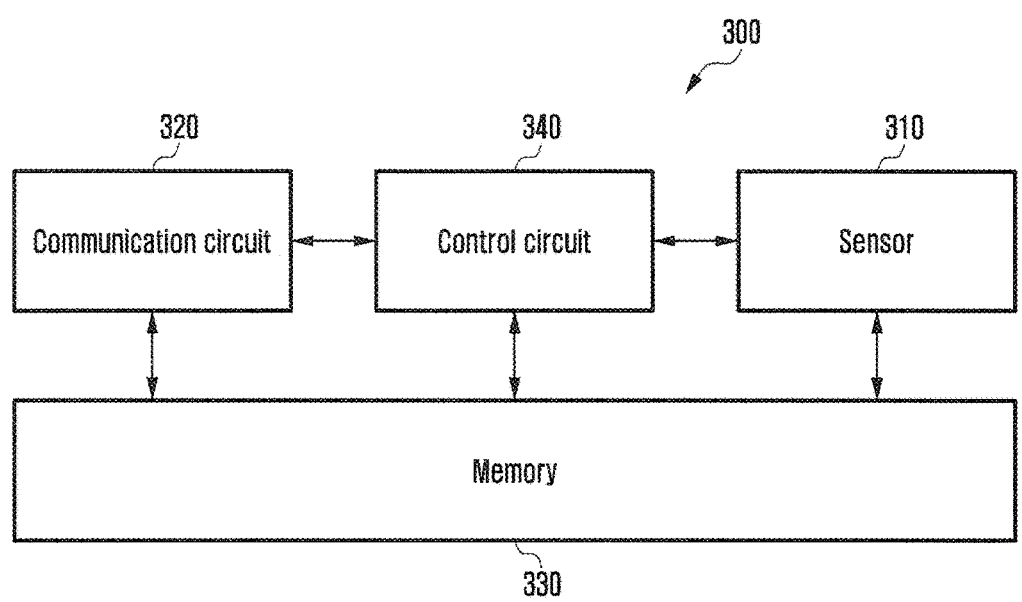

FIG. 3 is a block diagram illustrating a configuration of an electronic device 300 according to various exemplary embodiments.

The electronic device 300 can include, for example the entire or a portion of the electronic device 101 of FIG. 1 or the entire or a portion of the electronic device 201 of FIG. 2.

As shown in FIG. 3, the electronic device 300 can include a sensor 310, communication circuit 320, memory 330, and control circuit 340.

The constituent elements of the electronic device 300 according to various exemplary embodiments can be positioned inside a housing (not shown) of the electronic device 300. The housing can be referred to as a support structure, coupling structure, or fixed material (fixing portion). The housing can be positioned at an outer portion of the electronic device 300 to be an external structure and can be positioned inside the electronic device 300 to be an internal structure.

The sensor 310 according to various exemplary embodiments can include the entire or a portion of the sensor module 240 of FIG. 2. For example, the sensor 310 can include at least one of a grip sensor and a proximity illumination sensor configured to detect a distance between a portion (e.g., a portion of a display (not shown), a portion of a housing (not shown), and a portion of the sensor 310) of the electronic device 300 and an external object (e.g., a portion of a human body). The sensor 310 according to an exemplary embodiment can include at least one of a capacitive sensor, optical sensor, and illumination sensor configured to detect a distance between a portion of the electronic device 300 and the external object.

The communication circuit 320 according to various exemplary embodiments can include the entire or a portion of the communication interface 170 of FIG. 1. Further, the communication circuit 320 can include the entire or a portion of the communication module 220 of FIG. 2. The communication circuit 320 according to an exemplary embodiment can provide wireless communication based on a short range communication method or a long distance communication method. For example, when providing wireless communication based on a short range communication method, the communication circuit 320 can provide wireless communication based on WiFi®, Bluetooth®, and Zigbee® protocols.

The communication circuit 320 according to an exemplary embodiment can provide first wireless communication based on a first protocol and second wireless communication based on a second protocol. In this case, the first protocol and the second protocol can be a WiFi® protocol.

Specifically, the first protocol can be IF EE 802.11x protocol, and the second protocol can be IEEE 802.11y protocol, and in this case, x and y can be different. For example, the first protocol can be IEEE 802.11a protocol, and the second protocol can be IEEE 802.11b protocol. Further, the first protocol is 5Generation Band x protocol, and the second protocol is 5Generation Band y protocol, and in this case, x and y can be different. For example, the first protocol can be 5Generation Band 2 protocol, and the second protocol can be 5Generation Band 5 protocol.

The memory 330 according to an exemplary embodiment can include the entire or a portion of the memory 130 of FIG. 1. Further, the memory 330 can include the entire or a portion of the memory 230 of FIG. 2. The memory 330 can store a power value that can transmit on a kind basis of wireless communication. For example, the memory 330 can store a power value according to a maximum power level of first wireless communication based on the first protocol and a power value according to a maximum power level of second wireless communication based on the second protocol. Further, the memory 330 can store each power value that can transmit in a power limit mode (e.g., a power off mode) on a kind basis of wireless communication.

The control circuit 340 according to various exemplary embodiments can include the entire or a portion of the processor 120 of FIG. 1. The control circuit 340 according to an exemplary embodiment can include the entire or a portion of the processor 210 of FIG. 2. The control circuit 340 according to an exemplary embodiment can be electrically coupled to the sensor 310, the communication circuit 320, and the memory 330.

When a distance between a portion of the electronic device and the external object is detected by the sensor 310, the control circuit 340 according to an exemplary embodiment can set a level of radiation power based on the detected distance and a kind of wireless communication provided by the communication circuit 320.

For example, when the communication circuit 320 provides first wireless communication based on the first protocol, if the detected distance is within a first range, the control circuit 340 can control the communication circuit 320 to provide first wireless communication at a first power level, and if the detected distance is outside a first range, the control circuit 340 can control the communication circuit 320 to provide first wireless communication at a second power level.

When the communication circuit 320 provides second wireless communication based on the second protocol, if the detected distance is within a second range different from the first range, the control circuit 340 according to an exemplary embodiment can control the communication circuit 320 to provide second wireless communication at a third power level, and if the detected distance is outside the second range, the communication circuit 320 can control the communication circuit 320 to provide second wireless communication at a fourth power level. In this case, the first range can be greater than the second range.

When the communication circuit 320 provides first wireless communication based on the first protocol, the control circuit 340 according to an exemplary embodiment can acquire a first range from the memory 330. Further, when the communication circuit 320 provides second wireless communication based on the second protocol, the control circuit 340 can acquire a second range from the memory 330.

When the communication circuit 320 according to an exemplary embodiment provides first wireless communication at a second power level based on the first protocol, the control circuit 340 can set a power amount for wireless communication to a first maximum power level, and when the communication circuit 320 provides second wireless communication at a fourth power level based on the second protocol, the control circuit 340 can set a power amount for wireless communication to a second maximum power level. In this case, the first maximum power level can be greater than the second maximum power level.

When the communication circuit 320 provides first wireless communication at a first power level based on the first protocol or provides second wireless communication at a third power level based on the second protocol, the control circuit 340 according to an exemplary embodiment can operate in a power limit mode. The power limit mode according to an exemplary embodiment can be a mode that limits power for wireless communication not to output to a maximum output.

In an exemplary embodiment, at least one of the control circuit 340 and the communication circuit 320 can include an Application Processor (AP) (not shown), Communication Processor (CP) (not shown), and power amplification module (PAM) (not shown).

The AP according to various exemplary embodiments can determine whether the detected distance is within a predetermined range based on a distance between a portion (e.g., a display (not shown), a housing, and the sensor 310) of the electronic device and the external object (e.g., a portion of a human body) sensed by the sensor 310. For example, if the detected distance is within a predetermined range, the AP can determine that a portion of the electronic device and the external object are adjacent. If the detected distance is outside a predetermined range, the AP according to an exemplary embodiment can determine that a portion of the electronic device and the external object are separated.

The CP according to an exemplary embodiment can receive adjacent state information or separation state information representing an adjacent state or a separation state between a portion of the electronic device and the external object from the AP.

The CP according to an exemplary embodiment can set a level of power radiated for wireless communication based on the received adjacent state information or separation state information.

For example, when the communication circuit 320 provides first wireless communication based on the first protocol, if adjacent information is received from the AP, the CP can set a level of radiated power to a first level. However, when separation information is received from the AP, the CP can set a level of radiated power to a second level.

When adjacent information is received from an AP according to an exemplary embodiment, if the communication circuit 320 provides second wireless communication based on the second protocol, the CP can set a level of radiated power to a third level. When separation information is received from the AP, the CP according to an exemplary embodiment can set a level of radiated power to a fourth level.

The power amplification module can receive a power level from the CP and transmit power according to the received power level to an antenna.

The antenna (not shown) can radiate power received from the power amplification module through a transmitting line in the air based on an antenna gain.

Figure 4A:
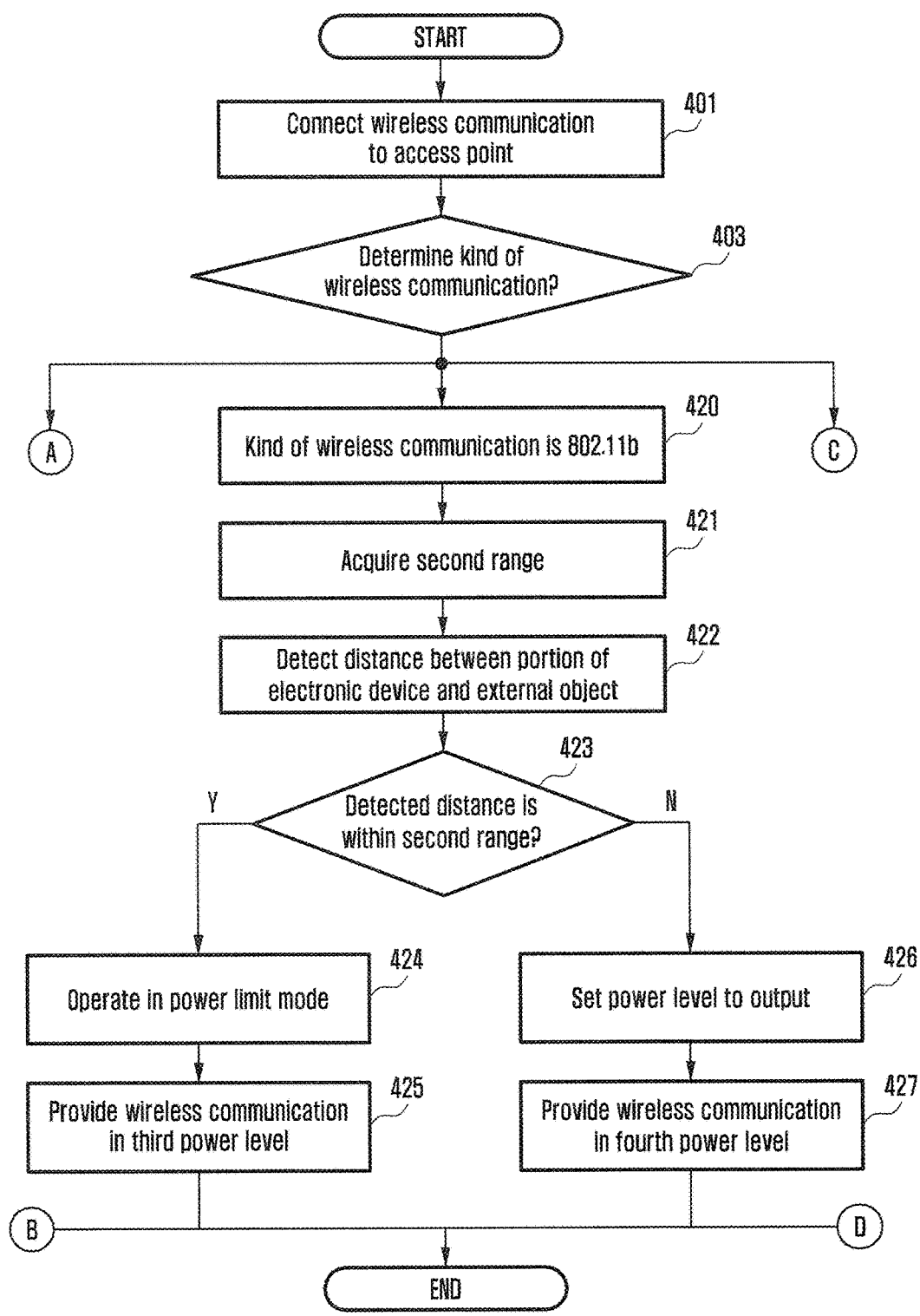
FIGS. 4A to 4C are flowcharts illustrating a method of controlling power according to various exemplary embodiments.
Figure 4B:
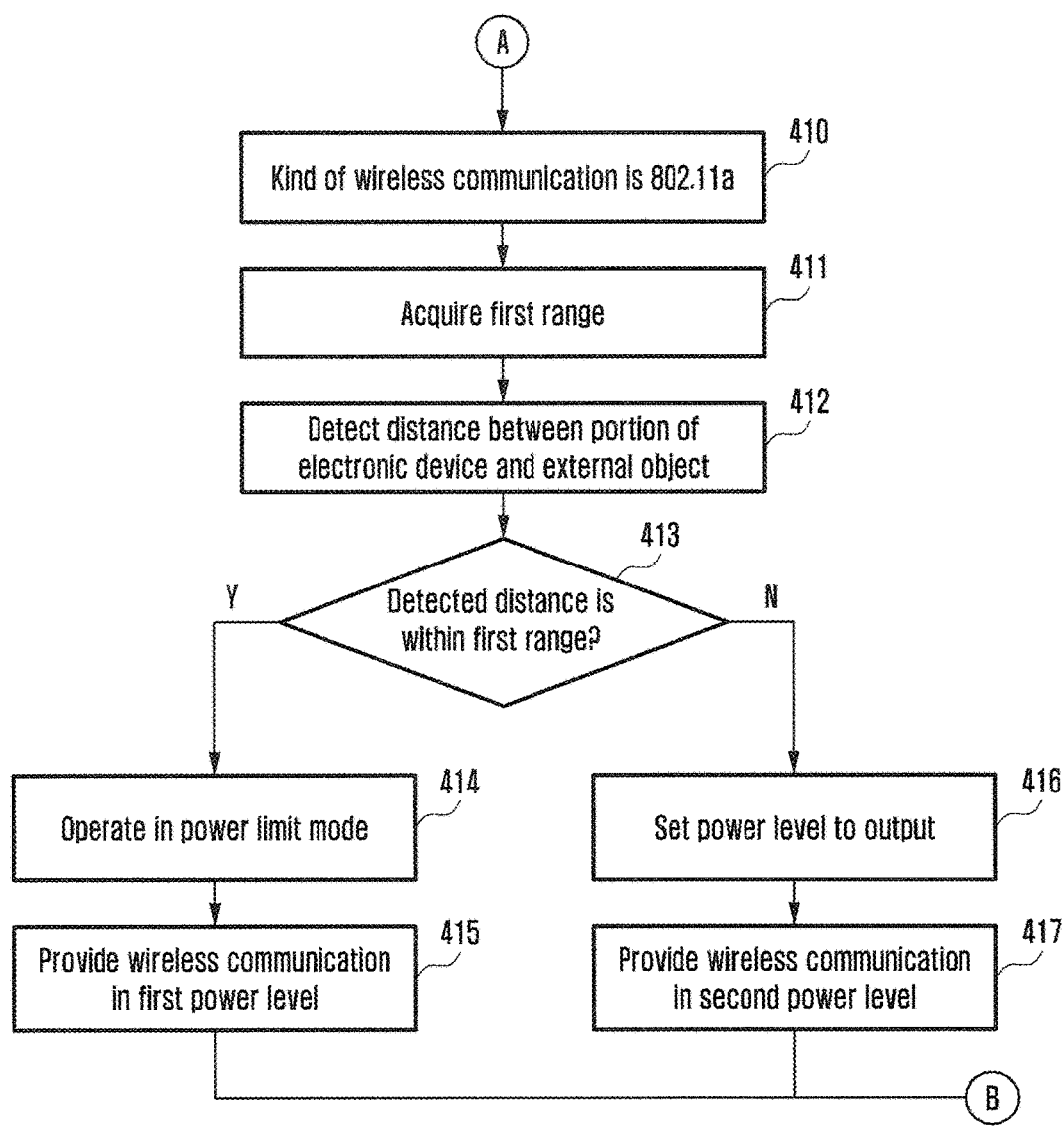
Figure 4C:
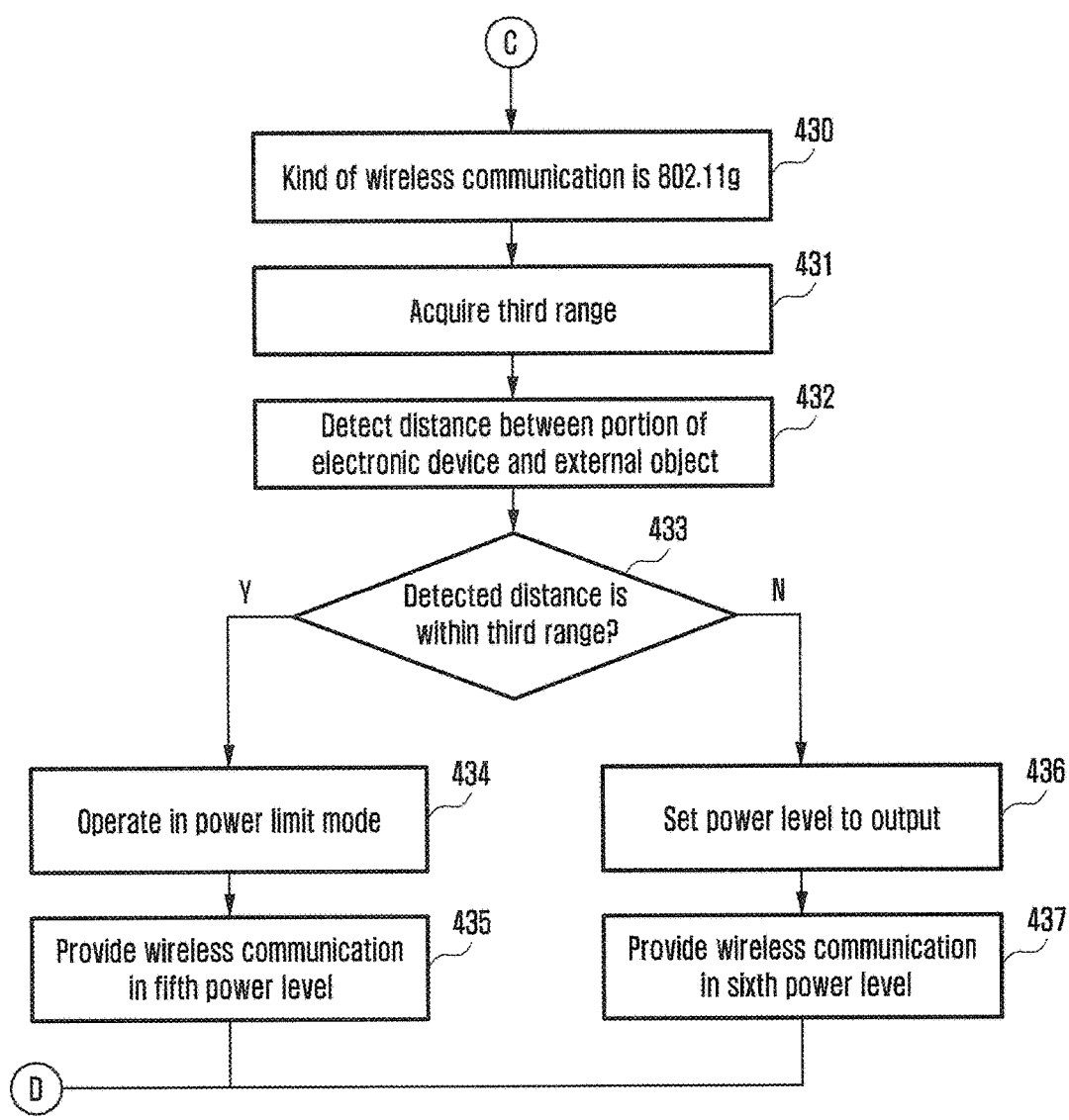

FIGS. 4A to 4C are a flowchart illustrating a method of controlling power according to various exemplary embodiments of the present disclosure.

As shown in FIGS. 4A to 4C, the electronic device 300 according to an exemplary embodiment can connect wireless communication to an access point positioned at the outside at operation 401. For example, the access point can be a repeater, sharer, or hub.

The electronic device 300 according to an exemplary embodiment can determine a kind of connected wireless communication at operation 403. The electronic device 300 according to an exemplary embodiment can determine a kind of wireless communication through a communication negotiation process with the access point (e.g., a repeater, sharer, or hub).

For example, a kind of wireless communication can mean a protocol method for wireless communication. For example, when the electronic device 300 connects wireless communication to the access point with a WiFi® method, a kind of wireless communication can be one of 802.11a, 802.11b, 802.11g, 802.11n, and 802.11ad.

The electronic device 300 according to an exemplary embodiment can acquire a range for determining whether a portion thereof and the external object are separated or adjacent on a kind basis of determined wireless communication.

When a kind of wireless communication is 802.11a mode at operation 410, the electronic device 300 can acquire a first range mapped to the 802.11a mode at operation 411. The first range can include a value of at least one distance among a predetermined range of distances. For example, the distance value d can be represented with d (11a). A value of d (11a) can be, for example a value between about 20 mm and about 40 mm.

A distance value according to an exemplary embodiment can be represented with a capacitance value. A capacitance value Farad (F) according to an exemplary embodiment can be represented with $\lambda$ (11a). A capacitance value and a distance value according to an exemplary embodiment can be in an inversely proportional relationship. For example, as a capacitance value increases, a distance value can reduce. Further, as a capacitance value reduces, a distance value can increase.

Further, a distance value according to an exemplary embodiment can be represented with an illumination value.

When estimating a distance value using an illumination sensor, an illumination value Lux (L) can be represented with, for example L (11a).

At least one of a capacitance value, illumination value, and distance value according to an exemplary embodiment can be previously set by a producer of the electronic device 300, a provider of an application installed at the electronic device 300, or a provider of an operation system. At least one of a capacitance value, an illumination value, and a distance value according to an exemplary embodiment can be designated by a user or a developer through a user interface. For example, at least one of a capacitance value, illumination value, and distance value can be experimentally determined while repeatedly measuring a SAR value occurring according to a distance between a portion of the electronic device 300 and the external object such that radiation power of wireless communication based on 802.11a protocol does not exceed 1.6 mw/Kg, which is a reference SAR value of a mobile phone radio wave rating system.

A method of obtaining at least one of the foregoing capacitance value, illumination value, and distance value can be applied to a method of determining a first range and a second range on a kind basis of wireless communication to be described later and therefore a detailed description thereof will be omitted.

With reference to FIG. 4B, the electronic device 300 according to an exemplary embodiment can detect a distance between a portion thereof and the external object at operation 412. For example, the electronic device 300 according to an exemplary embodiment can detect a distance between a portion (e.g., display (not shown), housing, the sensor 310) thereof and the external object (e.g., a portion of a human body) using the sensor 310 provided in the electronic device 300. Before performing connection for wireless communication to the access point or determining a kind of connected wireless communication, the electronic device 300 according to an exemplary embodiment can previously detect a distance between a portion thereof and the external object.

The electronic device 300 according to an exemplary embodiment can determine whether the detected distance is within a first range at operation 413. For example, determination of the electronic device 300 on whether the detected distance is within a first range can include determination on whether a capacitance of a capacitor sensed by the sensor 310 exceeds a first range. A first range used in determining a distance according to an exemplary embodiment and a first range used in determining a capacitance can have different values or different measuring units.

If the detected distance is within a first range, the electronic device 300 according to an exemplary embodiment can determine that a portion thereof and the external object are adjacent. A state in which a portion of the electronic device 300 and the external object are adjacent can be referred to as a 'human body adjacent state' or a 'human body contact state'.

If the detected distance is within a first range, the electronic device 300 can operate in a power limit mode (e.g., a power back off mode) in which radiation power for wireless communication is set not to exceed a reference SAR value (e.g., 1.6 mw/Kg) that satisfies a reference of a radio wave rating system at operation 414. The power limit mode can be a mode that limits power for wireless communication not to output to maximum power.

When the electronic device 300 operates in a power limit mode, the electronic device 300 can provide radiation power for wireless communication in a preset first power level at operation 415. The electronic device 300 according to an exemplary embodiment can perform wireless communication that transmits and receives data to and from an access point in a limited power level.

For example, the electronic device 300 can set a power amount that outputs for wireless communication to a first power level. In this case, the first power level can be a value between 40% and 70% of a maximum power level for wireless communication based on 802.11a protocol. For example, when a maximum power level of wireless communication is 12 dBm, the first power level can be a value between 5 dBm and 8 dBm.

Accordingly, even if a portion of the electronic device 300 and the external object are adjacent, by transmitting power with a reference SAR value of a radio wave rating system, the electronic device 300 can protect the user from a radio wave.

If the detected distance is outside a first range at operation 413, the electronic device 300 can determine that a portion thereof and the external object are separated. A state in which a portion of the electronic device 300 and the external object are adjacent can be referred to as a 'human body separation state' or a 'human body non-contact state'.

If the detected distance is outside a first range, the electronic device 300 can set a power level to output for wireless communication at operation 416. For example, the electronic device 300 can set a power amount that outputs for wireless communication to a second power level. In this case, the second power level can be a maximum power level for wireless communication based on 802.11a protocol.

Here, the maximum power level can be a power amount in which radiation power is previously set not to exceed a reference SAR value according to a radio wave rating system. A power value according to the maximum power level can be registered at a register to be previously stored at the memory 330. In this case, each power value according to different maximum power levels on a kind basis of wireless communication can be registered at the register. The maximum power level can be, for example about 12 dBm in wireless communication based on 802.11a protocol, but a maximum power level of wireless communication can have a range of various values according to a model of the electronic device 300, a SAR performance, a conduction performance, a specification of a communication provider, and an antenna gain and is not thus limited to the foregoing example.

The electronic device 300 according to an exemplary embodiment can provide radiation power for wireless communication based on 802.11a protocol in a preset second power level at operation 417. The electronic device 300 according to an exemplary embodiment can perform wireless communication that transmits/receives data to and from an access point in a maximum power level.

With reference to FIG. 4A, when a kind of wireless communication is 802.11b mode at operation 420, the electronic device 300 can acquire a second range mapped to the 802.11b mode at operation 421. The second range can include a value of at least one distance among a predetermined range of distances. For example, a distance value d can be represented with d (11b). A value of d (11b) can be, for example a value between about 80 mm and about 120 mm.

Further, the distance value can be represented with a capacitance value. In this case, a capacitance value Farad (F) can be represented with, for example λ (11b). Further, a distance value can be represented with an illumination value. In this case, an illumination value Lux (L) can be represented with, for example L (11a).

The electronic device 300 can detect a distance between a portion (e.g., a housing, display (not shown), sensor) thereof and the external object at operation 422.

The electronic device 300 can determine whether the detected distance is within a second range at operation 423. For example, determination on whether the detected distance is within a second range can include determination on whether a capacitance of a capacitor sensed by the sensor 310 exceeds a second range. In this case, a second range used in determining a distance and a second range used in determining a capacitance can have different values or different measuring units.

If the detected distance is within a second range, the electronic device 300 can operate in a power limit mode in which radiation power for wireless communication is set not to exceed a reference SAR value of a radio wave rating system at operation 424.

When the electronic device 300 according to an exemplary embodiment operates in a power limit mode, a power amount in which the electronic device 300 radiates can be set to a third power level. In this case, the third power level can be a value between 40% and 70% of a maximum power level for wireless communication based on 802.11b protocol. For example, when a maximum power level of wireless communication is 20 dBm, the first power level can be a value between 8 dBm and 14 dBm.

The electronic device 300 can provide radiation power for wireless communication based on 802.11b protocol in a preset third power level at operation 425.

If the detected distance is outside a second range, the electronic device 300 can set a power level to output for wireless communication at operation 426. For example, the electronic device 300 can set a power amount that outputs for wireless communication to a fourth power level. In this case, the fourth power level can be a maximum power level for wireless communication based on 802.11b protocol. Here, the maximum power level can be a power amount in which radiation power is set not to exceed a reference SAR value according to a radio wave rating system. The maximum power level can be, for example about 20 dBm in wireless communication based on 802.11b protocol, but can have a range of various values according to a condition of the electronic device 300 and is not thus limited to the foregoing example.

The electronic device 300 can provide radiation power for wireless communication based on 802.11b protocol in a preset fourth power level at operation 427.

With reference to FIG. 4C, when a kind of wireless communication is 802.11g mode at operation 430, the electronic device 300 can acquire a third range mapped to the 802.11g mode at operation 431. The third range can include a value of at least one distance among a predetermined range of distances. The distance value d can be represented with, for example d (11g). A value of d (11g) can be, for example between about 40 mm and about 60 mm.

Further, a distance value can be represented with a capacitance value. In this case, a capacitance value Farad (F) can be represented with, for example λ (11g). Further, the distance value can be represented with an illumination value. In this case, an illumination value Lux (L) can be represented with, for example L (11g).

The electronic device 300 can detect a distance between a portion thereof and the external object at operation 432.

The electronic device 300 can determine whether the detected distance is within a third range at operation 433.

For example, determination on whether the detected distance is within a third range can include determination on whether a capacitance of a capacitor sensed by the sensor 310 exceeds a third range. In this case, a third range used in determining a distance and a third range used in determining a capacitance can have different values or different measuring units.

If the detected distance is within a third range, the electronic device 300 can operate in a power limit mode in which radiation power for wireless communication is set not to exceed a reference SAR value of a radio wave rating system at operation 434.

When the electronic device 300 according to an exemplary embodiment operates in a power limit mode, a power amount in which the electronic device 300 radiates can be set to a fifth power level. In this case, the fifth power level can be a value between 40% and 70% of a maximum power level for wireless communication based on 802.11g protocol. For example, when a maximum power level of wireless communication is 12 dBm, the first power level can be a value between 5 dBm and 8 dBm.

The electronic device 300 can provide radiation power for wireless communication based on 802.11g protocol in a preset fifth power level at operation 435.

If the detected distance is outside a third range, the electronic device 300 can set a power level to output for wireless communication at operation 436. For example, the electronic device 300 can set a power amount that outputs for wireless communication to a sixth power level. In this case, the sixth power level can be a maximum power level for wireless communication based on 802.11g protocol. Here, the maximum power level can be a power amount in which radiation power is set not to exceed a reference SAR value according to a radio wave rating system. The maximum power level can be, for example about 12 dBm in wireless communication based on 802.11b protocol, but can have a range of various values according to a condition of the electronic device 300 and is not thus limited to the foregoing example.

The electronic device 300 can provide radiation power for wireless communication based on 802.11g protocol in a preset sixth power level at operation 437.

The electronic device 300 can determine a kind of wireless communication connected to the access point in addition to the foregoing kinds (IEEE 802.11a, IEEE 802.11b, and IEEE 802.11g) of wireless communication.

The electronic device 300 can determine a range of radiation power that does not exceed a reference SAR value on each kind basis of wireless communication according to a determination result. As described above, the range can be previously determined and acquired from the memory 330 of the electronic device 300. The range can have each different value on each kind basis of wireless communication.

If a distance between a portion of the electronic device and the external object is within a predetermined range, the electronic device 300 according to an exemplary embodiment operates in a power limit mode to operate at a first power level, and if a distance between a portion of the electronic device and the external object is outside a predetermined range, the electronic device 300 can operate at a second power level, which is a maximum power level. In this case, the first power level and the second power level each can have different values on a kind basis of wireless communication.

Accordingly, optimized power that does not exceed a reference SAR value on each kind basis of wireless communication is transmitted and thus the electronic device 300 can transmit and receive data to and from the access point with an enhanced performance. That is, a transmission and reception speed of data can increase.

Figure 5:
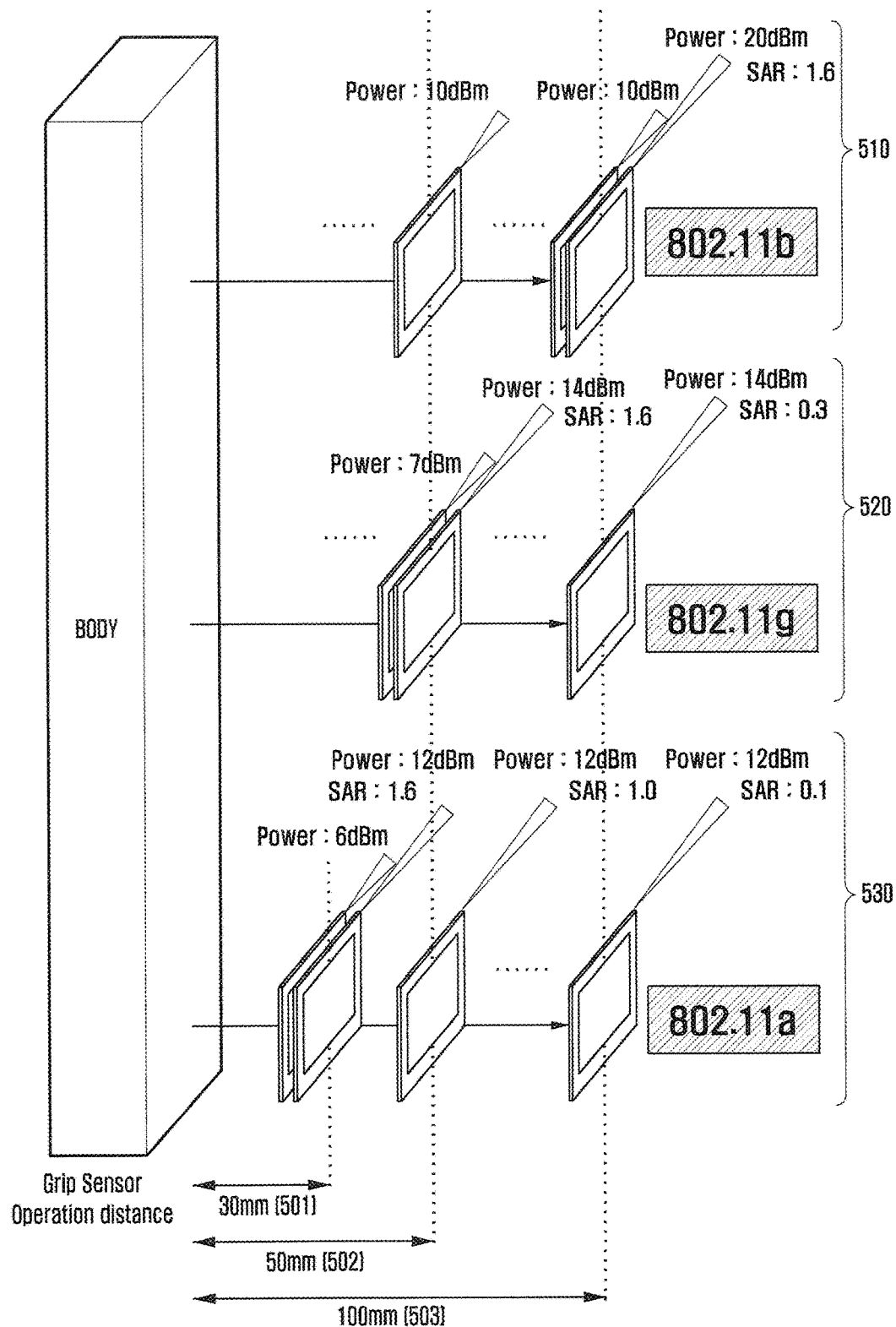
FIG. 5 is a diagram illustrating a change of radiation power according to a movement of an electronic device according to various exemplary embodiments.

FIG. 5 is a diagram illustrating a change of radiation power according to a movement of an electronic device 300 according to various exemplary embodiments.

With reference to 510 of FIG. 5, in an example 510 in which a kind of wireless communication is 802.11b mode, when a distance between the external object and a portion of the electronic device 300 is a first distance (e.g., 50 mm) 502, the electronic device 300 can output power for wireless communication at a first power level (e.g., 10 dBm) according to operation of a power limit mode.

In such a situation, a distance between the external object and a portion of the electronic device 300 can increase. The electronic device 300 according to an exemplary embodiment can detect a distance between the external object and a portion thereof periodically or according to event occurrence.

The electronic device 300 according to an exemplary embodiment can determine whether the detected distance is outside a first range mapped to the 802.11b mode.

If the detected distance exceeds a second distance (e.g., 100 mm) 503 included in the first range, the electronic device 300 according to an exemplary embodiment can deviate from a power limit mode to output power for wireless communication at a second power level (e.g., 20 dBm). In this case, the second power level can be a maximum power level for wireless communication based on 802.11b protocol that does not exceed a reference SAR value (e.g., 1.6 mw/Kg).

Further, with reference to 520 of FIG. 5, in an example 520 in which a kind of wireless communication is 802.11g mode, when a distance between the external object and a portion of the electronic device 300 is less than a third distance (e.g., 50 mm), the electronic device 300 can output power for wireless communication at a third power level (e.g., 7 dBm) according to operation of a power limit mode.

In such a situation, a distance between the external object and a portion of the electronic device 300 can increase. In this case, the electronic device 300 can detect a distance between the external object and a portion thereof.

The electronic device 300 according to an exemplary embodiment can determine whether the detected distance is outside a second range mapped to the 802.11g mode.

If the detected distance exceeds a fourth distance (e.g., 50 mm) 502 included in the second range, the electronic device 300 can deviate from a power limit mode to output power for wireless communication at a fourth power level (e.g., 14 dBm). In this case, the fourth power level can be a maximum power level for wireless communication based on 802.11g protocol that does not exceed a reference SAR value.

Further, with reference to 530 of FIG. 5, in an example 530 in which a kind of wireless communication is 802.11a mode, when a distance between the external object and a portion of the electronic device 300 is less than a fifth distance (e.g., 30 mm) 501, the electronic device 300 can output power for wireless communication in a fifth power level (e.g., 6 dBm) according to operation of a power limit mode.

In such a situation, a distance between the external object and a portion of the electronic device 300 can increase. In this case, the electronic device 300 can detect a distance between the external object and a portion thereof.

The electronic device 300 can determine whether the detected distance is outside a third range mapped to the 802.11a mode.

If the detected distance exceeds a sixth distance value (e.g., 30 mm) 501 included in the third range, the electronic device 300 can deviate from a power limit mode to output power for wireless communication in a sixth power level (e.g., 12 dBm). In this case, the sixth power level can be a maximum power level for wireless communication based on 802.11a protocol that does not exceed a reference SAR value.

In this way, in the 802.11b mode, a power limit mode that limits output power operates when exceeding a second distance value, in the 802.11g mode, a power limit mode operates when exceeding a fourth distance value smaller than a second distance value and thus in a range that does not exceed a reference SAR value of a mobile phone radio wave rating system on a kind basis of wireless communication, an optimal communication performance can be provided.

In other words, conventionally, a reference range for entering a power limit mode on a kind basis of wireless communication was the same. For example, a distance value to be a reference for entering a power limit mode without distinction of a kind of wireless communication was constant. Accordingly, because a characteristic of a SAR value differently measured on a kind basis of wireless communication is not reflected, it was difficult to exhibit an optimal communication performance appropriate to each kind of wireless communication. However, according to the present disclosure, because each range to be an optimal reference is determined in consideration of a characteristic of a SAR value measured in each kind of wireless communication, an optimal communication performance is expected on a kind basis of wireless communication.

Figure 6:
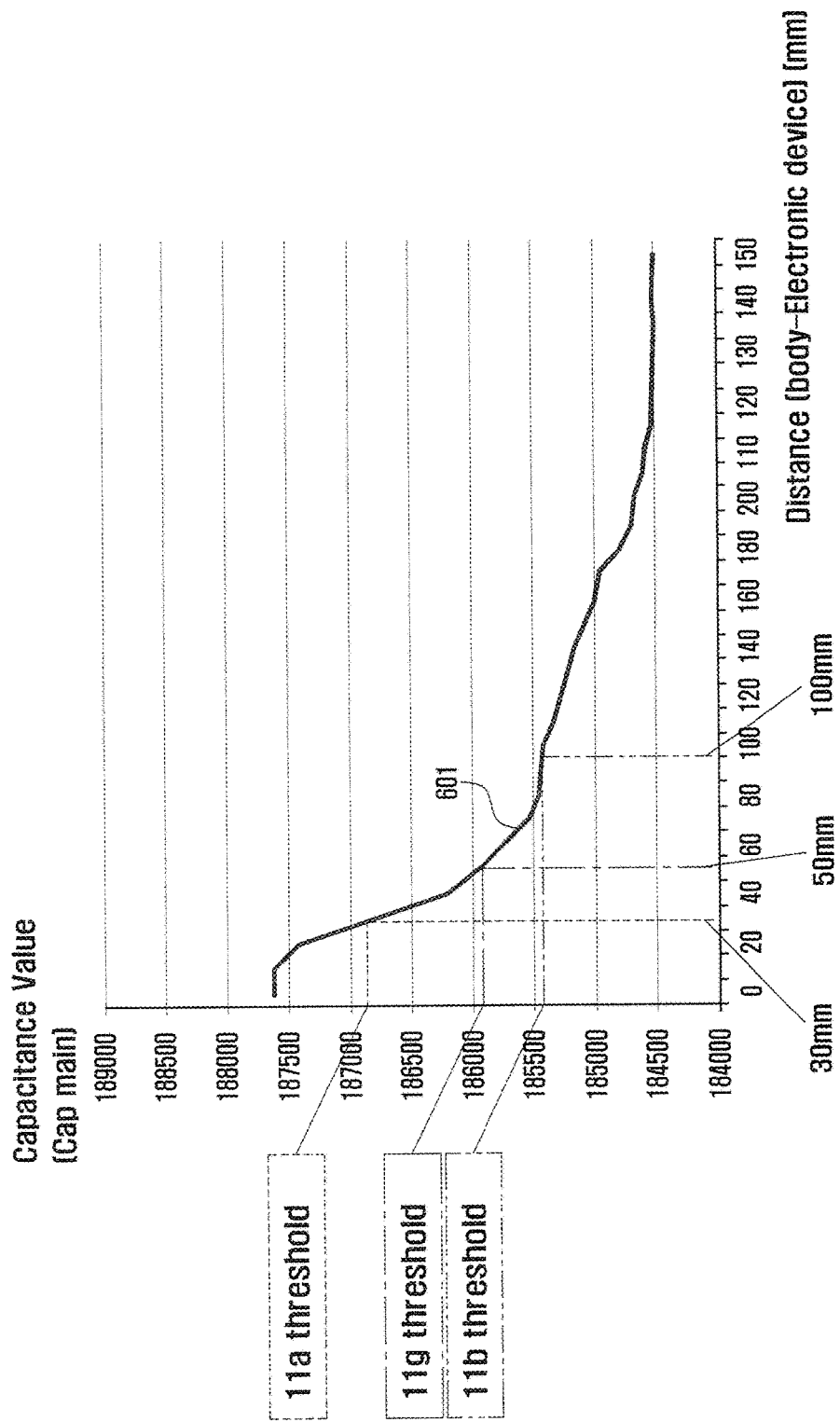
FIG. 6 is a graph representing a capacitance change of a capacitor according to various exemplary embodiments.

FIG. 6 is a graph representing a capacitance change of a capacitor according to various exemplary embodiments.

With reference to FIG. 6, the sensor 310 of the electronic device 300 according to an exemplary embodiment can include a capacitor having a changing capacitance according to a distance between the external object and a portion of the electronic device 300. As the distance reduces, a capacitance can increase, and as the distance increases, a capacitance can decrease. In a graph 601 of FIG. 6, x-axis can represent the distance value, and y-axis can represent a capacitance value inversely proportional to a distance value. A value of y-axis can be a standard value provided by an experiment measurement device for representing a relative relationship of x-axis and y-axis instead of a farad value, which is a unit of a capacitor.

With reference to the graph 601 of FIG. 6, a distance value and a capacitance value in which radiation power does not exceed a reference SAR value (e.g., 1.6 mw/Kg) of a radio wave rating system on a kind basis of wireless communication can be experimentally determined.

For example, when a kind of wireless communication is 802.11a mode, a distance value that does not exceed the reference SAR value can be 30 mm and a capacitance value corresponding to the distance value can be about 187000. Further, when a kind of wireless communication is 802.11g mode, a distance value that does not exceed the reference SAR value can be 50 mm and a capacitance value corresponding to the distance value can be about 186000. Further, when a kind of wireless communication is 802.11b mode, a distance value that does not exceed the reference SAR value can be 100 mm and a capacitance value corresponding to the distance value can be about 185500.

With reference to the graph 601 of FIG. 6, at least one of a distance value and a capacitance value determined on a kind basis of wireless communication can be included in a reference range for entering or separating from a power limit mode.

For example, in FIG. 6, when a kind of wireless communication is 802.11a mode, a distance value d (11*a*) included in a first range can be 30 mm, and λ (11*a*) corresponding to a distance value d (11*a*) can be 187000.

Further, in FIG. 6, when a kind of wireless communication is 802.11b mode, a distance value d (11*b*) included in the first range can be 100 mm, and Δ (11*a*) corresponding to a distance value d (11*b*) can be 185500.

Further, in FIG. 6, when a kind of wireless communication is 802.11g mode, a distance valued (11*g*) included in the first range can be 50 mm, and λ (11*g*) corresponding to a distance value d (11*g*) can be 186000.

In this way, according to an exemplary embodiment of the present disclosure, a reference range for entering a power limit mode on a kind basis of wireless communication is different and thus a communication performance can be optimized on a kind basis of wireless communication.

Figure 7:
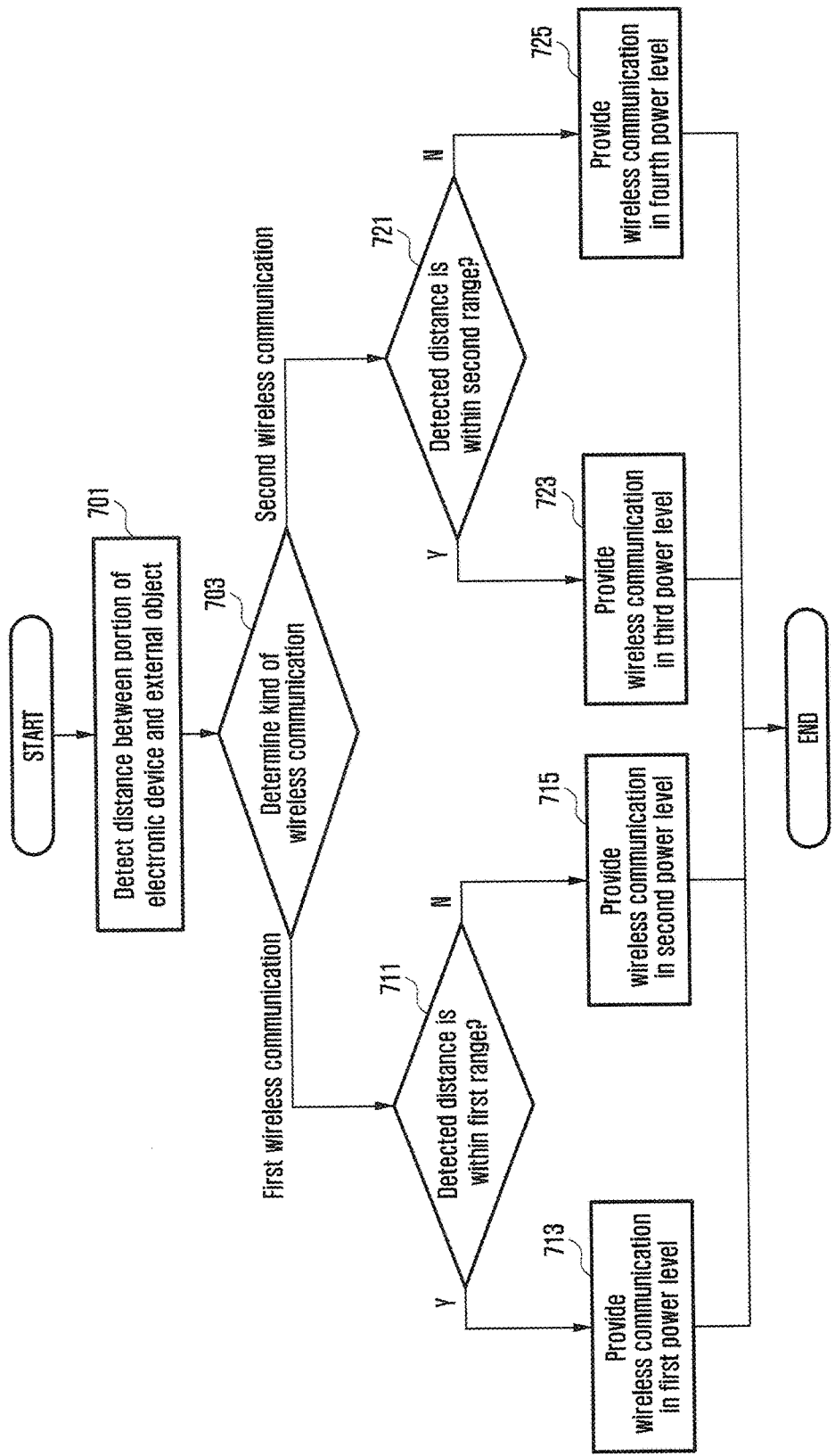
FIG. 7 is a flowchart illustrating a method of controlling radiation power according to various exemplary embodiments of the present disclosure.

FIG. 7 is a flowchart illustrating a method of controlling radiation power according to various exemplary embodiments of the present disclosure.

The electronic device 300 can detect a distance between a portion thereof and the external object at operation 701.

The electronic device 300 can determine a kind of wireless communication connected to or to be connected to an external device (e.g., access point) at operation 703. The electronic device 300 according to various exemplary embodiments can perform operation 703 before performing operation 701. The electronic device 300 according to an exemplary embodiment can determine a kind of wireless communication and detect a distance between a portion (e.g., an antenna, display (not shown), housing) thereof and the external object.

When the electronic device 300 provides first wireless communication based on the first protocol, the electronic device 300 can determine whether the detected distance is within a first range at operation 711. The electronic device 300 according to an exemplary embodiment can acquire information about the first range from the memory 330 thereof.

If the detected distance is within a first range, the electronic device 300 according to an exemplary embodiment can provide wireless communication at a first power level at operation 713. The electronic device 300 according to an exemplary embodiment can operate in a power limit mode to provide wireless communication at a first power level.

If the detected distance is outside a first range, the electronic device 300 can provide wireless communication at a second power level at operation 715. A power amount of a second power level according to an exemplary embodiment can be greater than that of a first power level.

When the electronic device 300 provides second wireless communication based on the second protocol, the electronic device 300 can determine whether the detected distance is within a second range at operation 721. The electronic device 300 according to an exemplary embodiment can acquire information about the second range from the memory 330.

If the detected distance is within a second range, the electronic device 300 can provide wireless communication at a third power level at operation 723. The electronic device 300 according to an exemplary embodiment can operate in a power limit mode to provide wireless communication at a third power level.

If the detected distance is outside a second range, the electronic device 300 can provide wireless communication at a fourth power level at operation 725. The electronic device 300 according to an exemplary embodiment can set a power amount for wireless communication to a fourth maximum power level. Further, a power amount of the fourth power level can be greater than that of the third power level.

Figure 8:
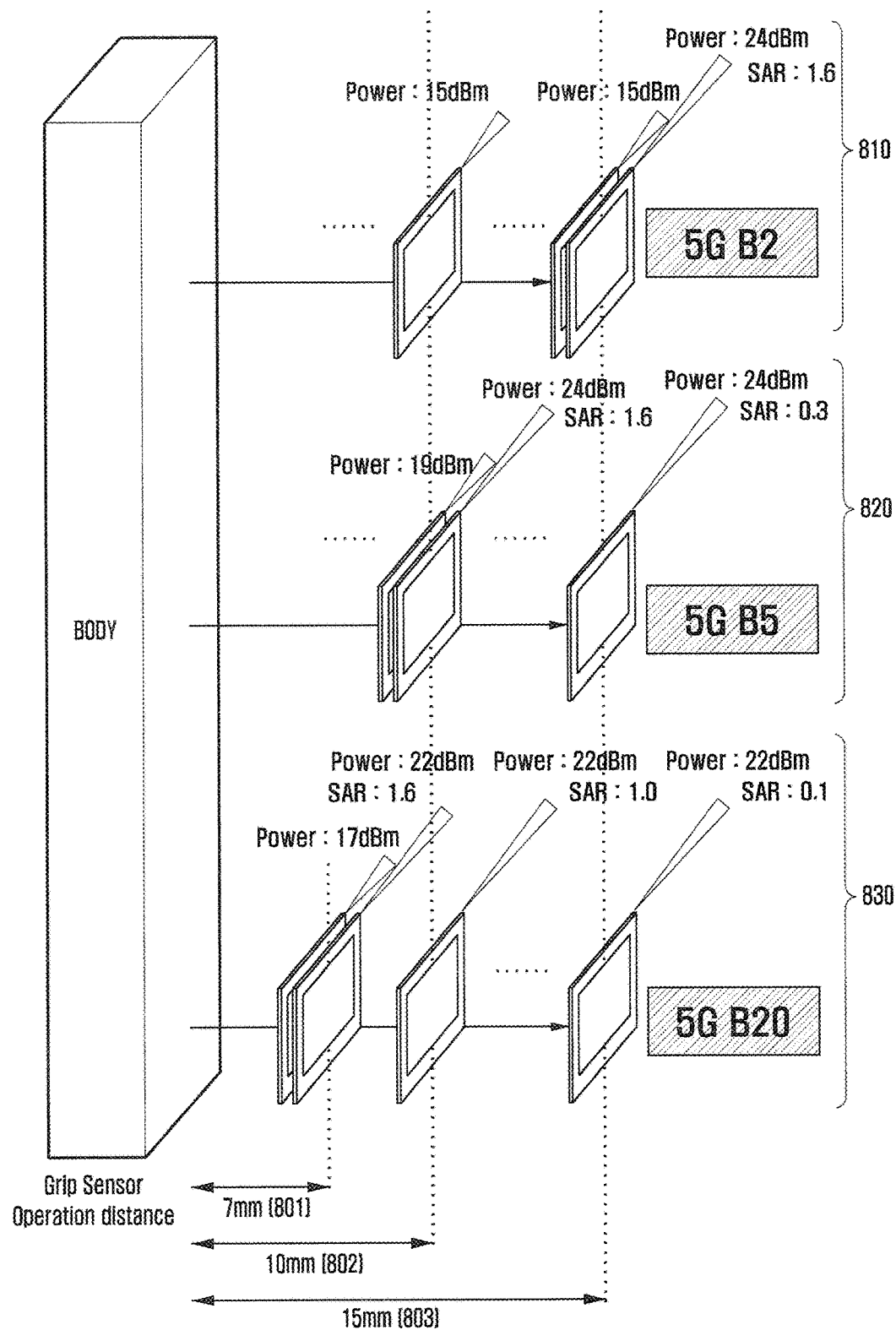
FIG. 8 is a diagram illustrating a change of radiation power according to a movement of an electronic device according to various exemplary embodiments of the present disclosure.

FIG. 8 is a diagram illustrating a change of radiation power according to a movement of an electronic device according to various exemplary embodiments of the present disclosure.

With reference to 810 of FIG. 8, when a kind of wireless communication is 5Generation Band 2 (5G B2) mode, if a distance between the external object and a portion of the electronic device 300 is a first distance (e.g., 10 mm) 802, the electronic device 300 according to an exemplary embodiment can output power for wireless communication at a first power level (e.g., 15 dBm) according to operation in a power limit mode.

The electronic device 300 according to various exemplary embodiments can increase a gap from the external object. The electronic device 300 according to an exemplary embodiment can detect a distance between the external object and a portion thereof periodically or according to event occurrence.

The electronic device 300 according to an exemplary embodiment can determine whether the detected distance is outside a first range mapped to the 5G B2 mode. When the detected distance exceeds a second distance (e.g., 15 mm) 803 included in the first range, the electronic device 300 according to an exemplary embodiment can deviate from a power limit mode to output power for wireless communication at a second power level (e.g., 24 dBm). In this case, the second power level can be a maximum power level for wireless communication based on 5G B2 protocol that does not exceed a reference SAR value (e.g., 1.6 mw/Kg).

With reference to 820 of FIG. 8, in an example 820 in which a kind of wireless communication is 5Generation Band 5 (5G B5) mode, when a distance between the external object and a portion of the electronic device 300 is less than a third distance (e.g., 10 mm), the electronic device 300 can output power for wireless communication at a third power level (e.g., 19 dBm) according to operation in a power limit mode.

A distance between a portion of the electronic device 300 according to various exemplary embodiments of the present disclosure and the external object can increase. The electronic device 300 according to an exemplary embodiment can detect a distance between the external object and a portion thereof.

The electronic device 300 according to various exemplary embodiments can determine whether the detected distance deviates from a second range mapped to 5G B5 mode. If the detected distance exceeds a fourth distance (e.g., 10 mm) 802 included in the second range, the electronic device 300 according to an exemplary embodiment can deviate from the power limit mode to output power for wireless communication at a fourth power level (e.g., 24 dBm). In this case, the fourth power level can be a maximum power level for wireless communication based on 5G B5 protocol that does not exceed a reference SAR value.

With reference to 830 of FIG. 8, in an example 830 in which a kind of wireless communication is 5Generation Band 20 (5G B20) mode, when a distance between the external object and a portion of the electronic device 300 is less than a fifth distance (e.g., 7 mm) 801, the electronic device 300 can output power for wireless communication in a fifth power level (e.g., 17 dBm) according to operation in a power limit mode.

The electronic device 300 according to various exemplary embodiments of the present disclosure can increase a distance from the external object. In this case, the electronic device 300 can detect a distance between the external object and a portion thereof.

The electronic device 300 can determine whether the detected distance deviates from a third range mapped to the 5G B20 mode.

When the detected distance exceeds a sixth distance value (e.g., 7 mm) 801 included in the third range, the electronic device 300 according to an exemplary embodiment of the present disclosure can deviate from a power limit mode to output power for wireless communication in a sixth power level (e.g., 22 dBm). In this case, the sixth power level can be a maximum power level for wireless communication based on 5G B20 protocol that does not exceed a reference SAR value.

In this way, in the 5G B2 mode, a power limit mode that limits output power operates when exceeding a second distance value, in the 5G B5 mode, a power limit mode operates when exceeding a fourth distance value smaller than a second distance value and thus in a range that exceeds a reference SAR value of a mobile phone radio wave rating system on a kind basis of wireless communication, an optimal communication performance can be provided.

A communication protocol that supports a high band (e.g., 5G B2, 5G B3, 5G B7) among communication protocols (e.g., 5G B2, 5G B5, 5G B20) according to various exemplary embodiments of the present disclosure can have a higher SAR value in the same power than a communication protocol that supports a low band (e.g., 5G B5, 5G B8, 5G B20).

Figure 9:
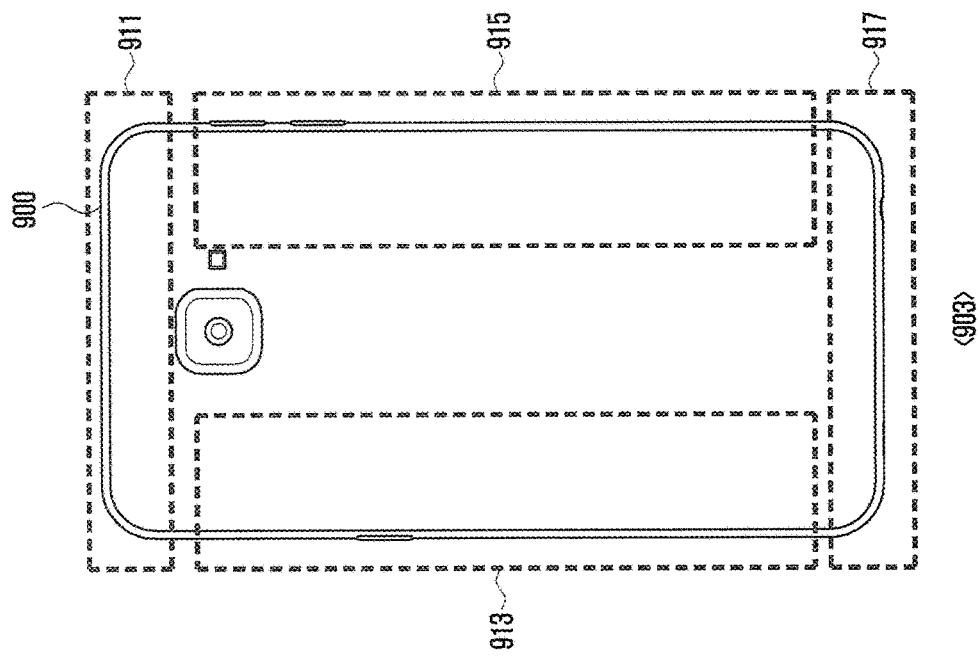
FIG. 9 is a diagram illustrating a sensor recognition area of an electronic device according to various exemplary embodiments of the present disclosure.
Figure 9:
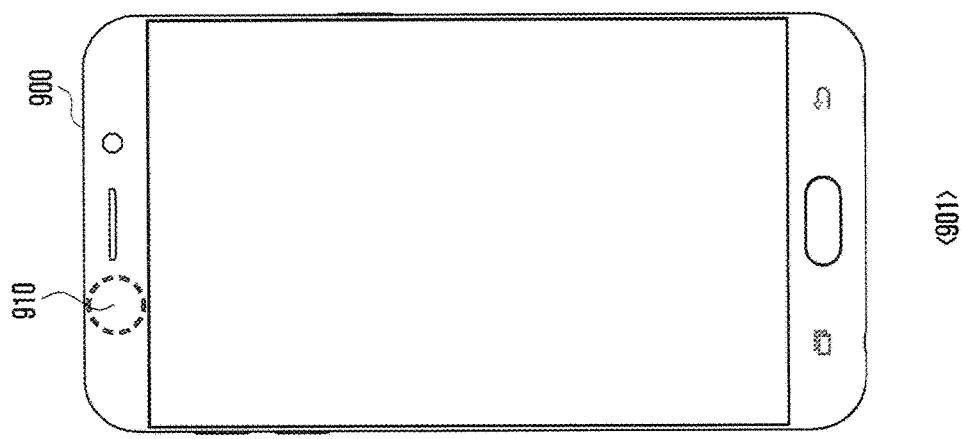

FIG. 9 is a diagram illustrating a sensor recognition area of an electronic device according to various exemplary embodiments of the present disclosure.

An electronic device 900 according to various exemplary embodiments of the present disclosure can be the electronic device 101 of FIG. 1, the electronic device 201 of FIG. 2, and/or the electronic device 300 of FIG. 3.

The electronic device 900 according to various exemplary embodiments of the present disclosure can mount a sensor in one area of the electronic device 900. The sensor can include at least one sensor (e.g., grip sensor 240F, illumination sensor 240K) included in the sensor module 240 of FIG. 2. With reference to 901 of FIG. 9, the electronic device 900 according to various exemplary embodiments can mount a proximity illumination sensor in a proximity illumination sensor recognition area 910. The electronic device 900 according to an exemplary embodiment can detect outside illumination of the electronic device 900 through the mounted proximity illumination sensor. The electronic device 900 according to an exemplary embodiment can detect a distance to the external object through the proximity illumination sensor.

With reference to 903 of FIG. 9, the electronic device 900 according to various exemplary embodiments can divide a grip recognition area into a first sensor recognition area 911, a second sensor recognition area 913, a third sensor recognition area 915, and a fourth sensor recognition area 917. When a grip of the electronic device 900 by the external object (e.g., a human body) is detected through a grip sensor, the electronic device 900 according to an exemplary embodiment can determine a grip detection area. For example, the electronic device 900 can detect and determine grip of the second sensor recognition area 913 and the third sensor recognition area 915 by the external object by a grip recognition sensor.

The electronic device 900 according to various exemplary embodiments can detect a distance to the external object through the grip recognition sensor. The electronic device 900 according to various exemplary embodiments can mount a grip sensor in one area of the first sensor recognition area 911, the second sensor recognition area 913, the third sensor recognition area 915, and the fourth sensor recognition area 917.

The term "module" used in the present disclosure can refer to, for example, a unit including one or more combinations of hardware, software, and firmware. The "module" can be interchangeable with a term, such as "unit," "logic," "logical block," "component," "circuit," or the like. The "module" can be a minimum unit of a component formed as one body or a part thereof. The "module" can be a minimum unit for performing one or more functions or a part thereof. The "module" can be implemented mechanically or electronically. For example, the "module" according to an embodiment of the present disclosure can include at least one of an Application-Specific Integrated Circuit (ASIC) chip, a Field-Programmable Gate Array (FPGA), and a programmable-logic device for performing certain operations which have been known or are to be developed in the future.

Examples of computer-readable media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices can be configured to act as one or more software modules in order to perform the operations and methods described above, or vice versa.

Modules or programming modules according to the embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

By differently making a range of a radiation power level operated on a kind basis of wireless communication, an electronic device according to various exemplary embodiments of the present disclosure can optimize communication efficiency on each wireless communication kind basis.

As Internet of Things (IoT) is widely used, transmission power for communication with a plurality of devices may increase, and when communicating with a plurality of devices, an electronic device according to various exemplary embodiments of the present disclosure minimizes deterioration of a communication performance according to an electromagnetic wave, thereby performing efficient communication.

In addition, an effect that may be obtained or estimated due to an exemplary embodiment of the present disclosure is directly or implicitly described in the detailed description of an exemplary embodiment of the present disclosure. That is, various effects that are estimated according to an exemplary embodiment of the present disclosure will be described in the detailed description.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a housing;
   at least one communication circuit positioned inside the housing, wherein the at least one communication circuit is configured to provide a first wireless communication based on a first protocol, and second wireless communication based on a second protocol;
   a sensor configured to detect a distance between a portion of the housing and a portion of a human body; and
   a control circuit configured to:
      cause the communication circuit to provide the first wireless communication at a first power level when the distance is within a first range, and at a second power level when the distance is outside the first range, and
      cause the communication circuit to provide the second wireless communication at a third power level when the distance is within a second range, and at a fourth power level when the distance is outside the second range, wherein the second range is different from the first range.

2. The device of claim 1, wherein the control circuit comprises a processor electrically coupled to the at least one communication circuit and the sensor, and a memory electrically coupled to the processor.

3. The device of claim 2, wherein the control circuit acquires the first range from the memory, when the communication circuit provides the first wireless communication, and
   the control circuit acquires the second range from the memory, when the communication circuit provides the second wireless communication.

4. The device of claim 1, where the sensor comprises at least one of a capacitive sensor or an optic sensor.

5. The device of claim 1, wherein the first protocol and the second protocol are both WIFI® protocols.

6. The device of claim 5, wherein the first protocol is IEEE 802.11x protocol, and the second protocol is IEEE 802.11y protocol, and wherein x is different from y.

7. The device of claim 1, wherein the first protocol defines a first maximum power level, and wherein the second protocol defines a second maximum power level different from the first maximum power level.

8. The device of claim 1, wherein the control circuit is configured to set a power amount for the wireless communication based on the first protocol to a first maximum power level, when the communication circuit provides the first wireless communication at the second power level, and
   the control circuit is configured to set a power amount for the second wireless communication based on the second protocol to a second maximum power level, when the communication circuit is configured to provide the second wireless communication at the fourth power level.

9. The device of claim 8, wherein the first maximum power level is greater than the second maximum power level, and wherein the first range is greater than the second range.

10. The device of claim 1, wherein the control circuit is configured to operate power for the first wireless communication in a power limit mode that limits to less than a maximum output required for wireless communication, when the communication circuit is configured to provides the first wireless communication at the first power level.

11. The device of claim 1, wherein a capacitance of a capacitor sensed by the sensor exceeds a first range value when the distance is within a first range.

12. A method in which an electronic device provides wireless communication, the method comprising:
    detecting a distance between a portion of the electronic device and an external object;
    providing, if the detected distance is within a first range, a first wireless communication at a first power level; and
    providing, if the detected distance is outside the first range, the first wireless communication at a second power level, when a communication circuit provides the first wireless communication based on a first protocol; and
    providing, if the detected distance is within a second range, a second wireless communication at a third power level and providing, if the detected distance is outside the second range, the first wireless communication at a fourth power level, when the communication circuit provides the second wireless communication based on a second protocol,
    wherein the second range is different from the first range.

13. The method of claim 12, further comprising:
    acquiring the first range from a memory, when the communication circuit provides first wireless communication, and
    acquiring the second range from the memory, when the communication circuit provides second wireless communication.

14. The method of claim 12, wherein detecting a distance between a portion of the electronic device and an external object comprises detecting a distance between the portion of the electronic device and the external object using at least one of a capacitive sensor and an optical sensor.

15. The method of claim 12, wherein the first protocol and the second protocol are both WIFI® protocols.

16. The method of claim 12, wherein the first protocol is IEEE 802.11x protocol, and the second protocol is WEE 802.11y protocol, and wherein x is different from y.

17. The method of claim 12, further comprising:
    setting, when the communication circuit provides the first wireless communication at the second power level, a power amount for the first wireless communication based on the first protocol to a first maximum power level; and
    setting, when the communication circuit provides the second wireless communication at the fourth power level, a power amount for the second wireless communication based on the second protocol to a second maximum power level.

18. The method of claim 17, wherein the first maximum power level is greater than the second maximum power level, and the first range is greater than the second range.

19. The method of claim 12, further comprising providing the first wireless communication at the first power level by operating power for the first wireless communication in a power limit mode that limits less than a maximum output required for wireless communication, when the communication circuit provides the first wireless communication at the first power level.

20. The method of claim 12, further comprising determining a kind of wireless communication in which the electronic device provides,
  wherein the kind of wireless communication comprises the first wireless communication or the second wireless communication.

\* \* \* \* \*